April 27, 1954  C. A. McLEOD  2,676,850
ORNAMENTAL WHEEL TRIM FOR VEHICLE WHEELS
Filed Sept. 25, 1952  3 Sheets-Sheet 2
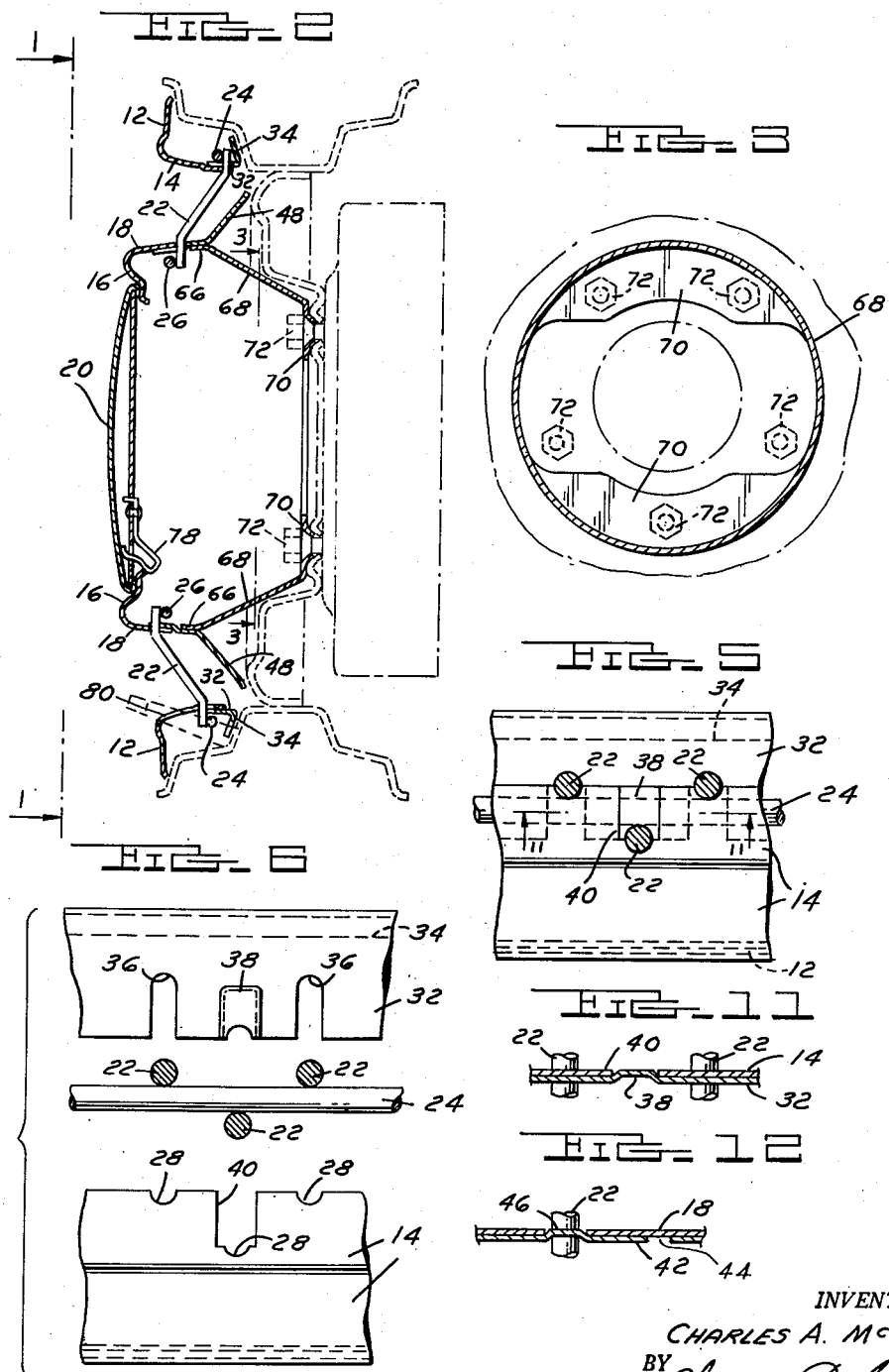
INVENTOR.
CHARLES A. McLEOD
BY
ATTORNEY April 27, 1954 C. A. McLEOD 2,676,850
ORNAMENTAL WHEEL TRIM FOR VEHICLE WHEELS
Filed Sept. 25, 1952 3 Sheets-Sheet 3
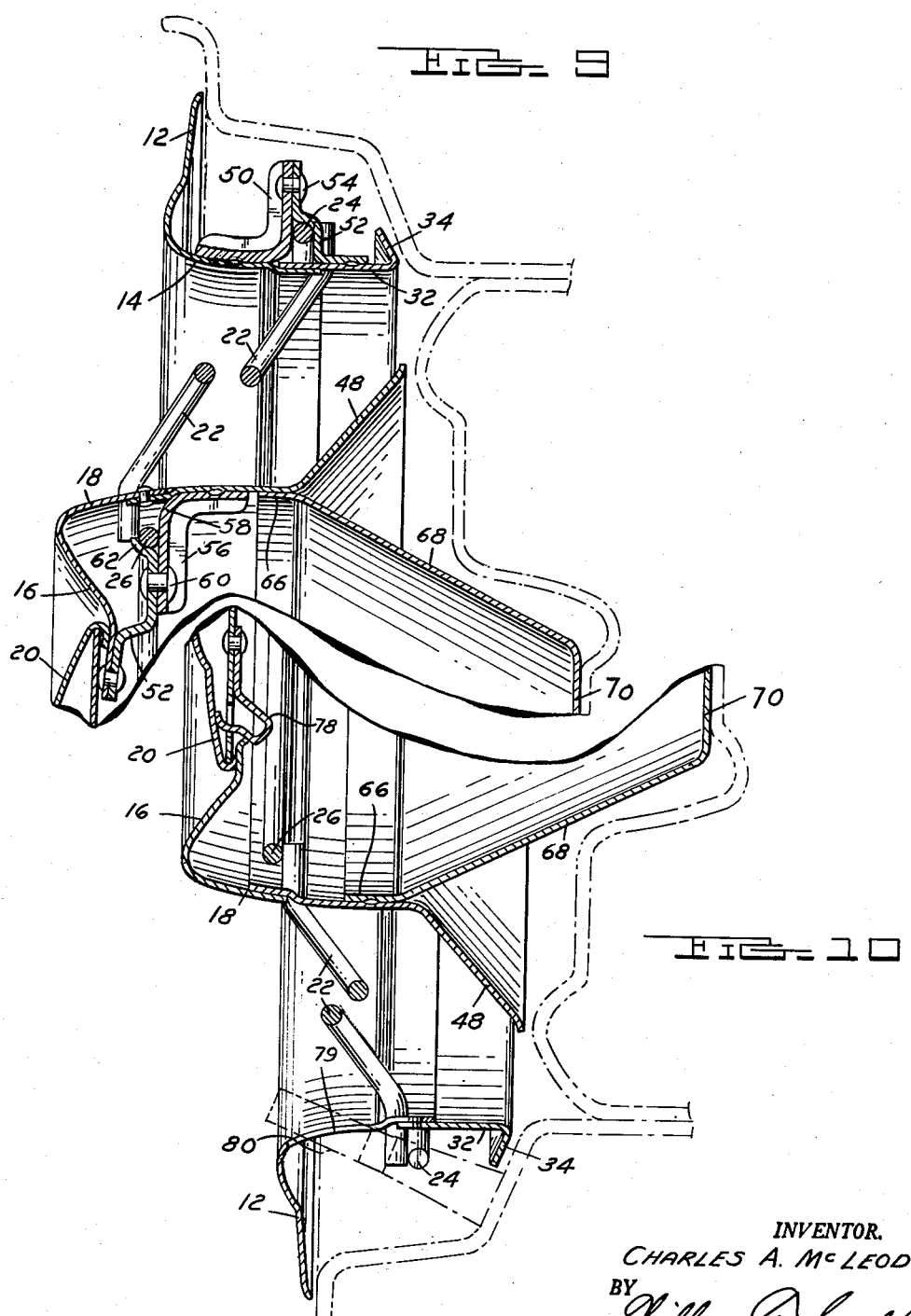
INVENTOR.
CHARLES A. McLEOD
BY
ATTORNEY Patented Apr. 27, 1954

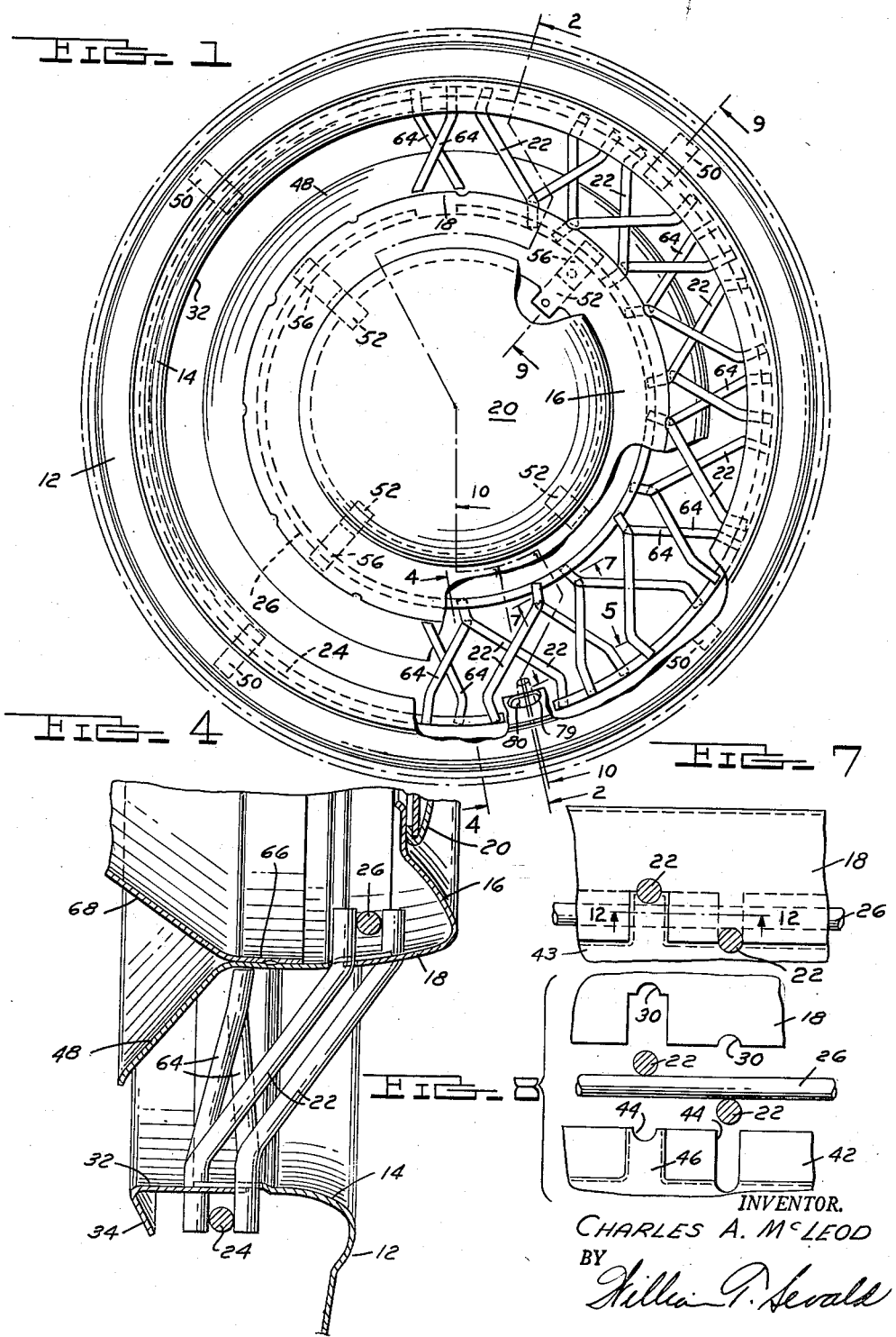

2,676,850

UNITED STATES PATENT OFFICE 2,676,850

ORNAMENTAL WHEEL TRIM FOR VEHICLE WHEELS

Charles A. McLeod, Birmingham, Mich., assignor to A. S. Campbell Company, Boston, Mass., a corporation of Massachusetts Application September 25, 1952, Serial No. 311,401

31 Claims. (Cl. 301—37)

This invention relates to an ornamental wheel trim for attachment over the side of an automobile wheel for embellishing the same.

A wheel as now commonly used in a motor vehicle is useful, but hardly decorative. The hub cap is usually brightly plated and sometimes includes a trade-mark design which some might consider ornamental. The rest is functional and drab. Therefore wheel trims, which are light structures of thin sheet metal or other material, are sometimes mounted over the side of the wheel to render it more attractive in appearance.

The present invention relates to such a trim and in particular to one adapted to cover substantially the entire outer face of the wheel from the rim to the central portion. The primary object is to provide a construction which may be cheaply made from parts which may be plated or otherwise finished for an attractive appearance within a wide range of variation, both as to form and finish. It is also one which may be easily repaired if damaged. It can be easily mounted or dismounted from the wheel while it is in position on a car, and without jacking the wheel up from the ground. In particular, the general appearance given to the wheel by the trim may be that of a wire spoke wheel which in itself is a relatively expensive construction, and the appearance of which is considered desirable. However, the parts may be easily and cheaply given an attractive finish which could not be applied to a functional wire spoke wheel unless at great cost. Also, because the limitations imposed on the design of a wire spoke wheel by the loads which it has to carry do not apply to the trim, the actual design may be in fact different as taste may dictate to provide a more attractive appearance.

The primary object of the invention is to provide a wheel trim which is greatly improved in design and construction, easy and inexpensive to manufacture, and highly satisfactory to mount, dismount, and use.

My invention will be well understood by reference to the following description taken in connection with the accompanying drawings therein—

Fig. 1 is a face elevation view of the wheel trim with parts broken away and is an enlarged view taken on the line 1—1 of Fig. 2.

Fig. 2 is a reduced cross-section taken on the line 2—2 of Fig. 1, the outlines of a conventional wheel on which the trim is mounted being shown in broken lines. It is to be noted that in this figure generally only the parts at the location of the sectioning plane are indicated and not the parts in the rear thereof.

Fig. 3 is a section on the line 3—3 of Fig. 2.

Fig. 4 is an enlarged section on line 4—4 of Fig. 1.

Fig. 5 is a segmental elevation and view of the outer member forming a part of the trim taken in the direction of the arrows 5—5 of Fig. 1.

Fig. 6 is a view showing the parts of Fig. 5 separated.

Fig. 7 is a view similar to Fig. 5 of the inner member and is taken in the direction of the arrows 7—7 of Fig. 1.

Fig. 8 is a view similar to Fig. 7, showing the parts separated.

Fig. 9 is an enlarged cross-sectional view of Fig. 1 taken on the line 9—9 thereof, similar to the upper portion of Fig. 2, showing the attaching means between the various parts.

Fig. 10 is an enlarged cross-sectional view of Fig. 1 taken on the line 10—10 thereof similar to the lower portion of Fig. 2.

Fig. 11 is a cross-sectional view of line 11—11 of Fig. 5; and

Fig. 12 is a section on line 12—12 of Fig. 7.

Except where the context clearly indicates otherwise the words "outer" and "inner" are used to mean radially outer and radially inner relative to the axis of the wheel while "front" or "forward" means the side of the wheel or of the mounted trim nearer the observer as he looks at it from the side of the car and "rearward" means behind that, nearer the longitudinal center line of the car.

Referring now to the drawings, the wheel trim here shown consists generally of a radially outer member which overlies and covers the portion of the exterior face of the wheel adjacent to the tire, and a radially inner member which overlies and covers the parts of the wheel near the center, and between them is what is herein termed the lattice, consisting of a multiplicity of spoke-simulating rods arranged in a definite pattern, which may correspond more or less closely to the disposition of spokes in a known form of wire spoke wheel, but which, however, may be considerably varied therefrom. Also, as will appear, one of the members includes a part disposed behind the lattice to form a background therefor and to hide the subjacent parts of the wheel. The two members above referred to are of thin, light material, conveniently sheet metal, and they may be given an attractive exterior finish as by plating, enameling or other means, as may also the lattice, the finish either being uniform or varied among the several members as taste may dictate.

The radially outer member above referred to comprises an annulus 12 of suitable cross-sectional contour with a rearwardly turned flange 14 at its inner periphery. The inner member comprises a front portion having at its radially outer periphery a rearwardly turned flange. The front portion 16 may be annular, defining a central opening which may be closed either by the hub cap 20 supplied with the wheel, or by a special substitute therefor. Such a cap may be removed to provide for access to the mounting bolts of the wheel which, as will hereinafter appear, are utilized for mounting the trim.

The lattice which extends between the two members comprising a number of rods 22, a multiplicity of which are integrated into a unit to occupy at least a substantial segment of the annular space between the two members 12 and 16. Since the resulting unit will not be unwieldy it is convenient to provide, as illustrated, a single unit occupying the entire circumference. For this purpose the rods 22 of suitable length and shape are arranged in a desired pattern such for example as the one herein illustrated, and welded at their ends to curved outer and inner supporting elements 24 and 26 respectively which, in the case of a single unit for the entire wheel, take the forms of hoops. The hoops are so spaced as to lie at the rear of the front plates 12 and 16 in the assembled structure, and radially outward and inward of the flanges 14 and 18 respectively. The flange 14 may have recesses 28 formed therein (see Fig. 6) to form seats for the sides of the rods and the flange 18 has similar recesses 30 (see Fig. 8).

With the inner and outer members suitably spaced the lattice unit may be assembled therewith by movement of approach from the rear with the rods 22 entering the recesses 28 and 30 and seating on the seats at the bottoms thereof, the hoops 24 and 26 being received within their respective flanges 14 and 18 at the relatively remote sides thereof.

Suitable means are provided for securing the hoops in this position and these in the preferred form shown are rings. Referring to the radially outer member, the cooperating ring has a generally cylindrical outer portion 32 which telescopes within (radially outward of) the flange 14 of the outer member, and an outwardly turned flange 34 which apposes the outer portion of the drop center of the rim (see Figs. 2 and 9). The edge of the cylindrical portion 32 has recesses 36 apposing the recesses 28 in the flange 14 so that when the ring and flange are telescoped together a circular opening is formed which receives the rod. To facilitate the orientation of these parts an axially extending rib 38 may be struck up from the ring 32 (see Fig. 6) conveniently in alignment with one of the recesses 32 and a slot 40 opening to one of the companion recesses 30, receives this rib and guides the parts for accurate telescoping assembly with the spoke receiving recesses properly mated up (see Fig. 11). This rib and slot construction may occur at suitable intervals around the circumference.

Referring now to the inner member, the means for securing the lattice therein may comprise a ring having a generally cylindrical portion 42 which telescopes with the inwardly extending flange 18 and it is formed, similarly to the ring 32, with recesses 44 apposing the recesses 30 in that flange, and with the guiding ribs 46 similar to ribs 38. The ring herein is also provided with a flange 48 extending radially outwardly and axially rearwardly to provide a background for the lattice when viewed from the exterior of the wheel, and to conceal the subjacent parts of the wheel.

Suitable means are provided for securing the flanged rings 32 and 42 to the inner and outer members respectively, so that the former in effect form portions of the latter and at the same time for gripping and positioning the lattice unit. Herein (referring more particularly to Fig. 9) two part clips are utilized, of which a suitable number are disposed around the circumference of the wheel. Referring to the outer clips, as shown in Fig. 9, they comprise an angular member or bracket 50 having an arm welded to the interior (radially outward) surface of flange 14 and an upstanding arm presented to the hoop 24 when the lattice is assembled. A somewhat similar bracket 52 on the ring 32 has an offset terminal portion which may be secured to the upstanding arm of bracket 50 by a suitable fastening such as the rivet 54, and referring to Fig. 9, it will be seen that the intermediate portion of the bracket 52 presents a diagonal surface to the hoop 26 so that not only does the clip embrace the sides and the exterior surface of the hoop, but when the fastening is set up forces are exerted tending to force the hoop inwardly and draw the parts to which the brackets are attached outwardly in opposite radial directions. The inner hoop 26 is secured by a somewhat similar clip embodying the bracket 56 connected to ring 42 and engaging one side of the hoop and an arm 58 secured near the rearward periphery of the annulus 16 and having an offset portion adapted to be secured to the bracket 56 by a fastening 60. This arm also has a hook-like projection 62 which engages the opposite side of the hoop 26 and supports the latter against the opposed thrust exerted by the diagonal surface of bracket 52, thus assuring a firm connection of the various parts.

All the rods which go to form the lattice need not be connected to both hoops, provided there are sufficient rods to maintain the hoops in their relative positions and to permit the assembly of the lattice unit in the manner described, and I have herein shown additional rods 64 secured at their ends to the outer hoop and projecting like the rods 22 through mating recesses in the telescoping flange 14 and ring 32, but these rods, as best seen at the lower portion of Fig. 4, may terminate just short of the inner member.

To secure the trim as a whole over the vehicle wheel a cup-shaped attaching member, best seen in Figs. 2 and 4, may be provided having a generally cylindrical end portion 66 which may be welded or riveted to the interior surface of ring 42 and a conical wall 68 tapering rearwardly toward the hub of the wheel. The cooperation of the cylindrical surfaces 66 and 42 permits the former to be telescoped more or less into the latter before welding or riveting to correspond to different distances in wheels of different make. At the location of the bottom of the cup inwardly extending perforated parts 70 adapt the structure for mounting on certain of the bolts 72 which retain the wheel on the brake drum, for instance the two upper and the lowermost bolts in Fig. 3. Between these perforated parts the bottom is cut away to provide a clearance so that at least one (two in Fig. 3) of the bolts 72 is unobstructed by the cup-like member. Assuming that the wheel is mounted, to attach the trim it is necessary only to remove certain of the nuts, leaving the wheel mounted and supporting the weight of the vehicle without any necessity of jacking up the wheel. The trim is placed over the side of the vehicle wheel so that the other bolts extend through the perforations in the extensions 70 and the nuts of those bolts are applied and tightened thereby supporting the trim in "full-floating" or non-touching relationship to the vehicle wheel except at the point of mutual attachment to the brake drum. A reverse action suffices to remove the wheel. In this case access to the bolts is had through the open center of the annular member 16 which is closed by a cap 20, which may be the original hub cap of the wheel or a substitute therefor, and which may be secured within the opening of the annulus by fastening means 76 of conventional or suitable form, and not requiring specific description here.

It will be noted that as herein described except in the limited central area where the part 70 overlies the inner periphery of the wheel disc and with it is rigidly bolted to the wheel drum no part of the trim touches the vehicle wheel.

Referring to Fig. 1, I have there shown the outer hoop 24 gapped (at about the 5 o'clock position) and the annulus 12 provided with an opening 79 to accommodate the inflating valve 80. Because of the rigidity imparted to the hoop by the rods 22 of the lattice, the former is not materially weakened. The hoop may be similarly gapped at a diametrically opposite point to preserve balance.

It will be noted that all the parts may be individually finished (by different means if desired) and that the assembly is very simply effected and requires no operations which would be likely to mar the finish applied. In case of damage to some of the parts, they are easily separated by driving out the rivets 54 and 60. The conical member forms a substantial support 68 for the trim as a whole, which is relatively light. In particular it may be pointed out that the spokes carry little or no weight, as contrasted with the wire spokes of an actual vehicle supporting wheel. It is therefore possible to chrome plate them without the necessity of subsequent stress annealing which would be required if the rods were spokes in function, as well as in appearance.

I am aware that the invention may be embodied in other specific forms without departing from the spirit or essential attributes thereof, and I therefore desire the present embodiment to be considered in all respects as illustrative and not restrictive, as is in fact clear in several matters from the description itself. Reference is to be had to the appended claims to indicate those principles of the invention exemplified by the particular embodiment described and which I desire to secure by Letters Patent.

I claim:

1. A wheel trim for mounting over the side of an automobile wheel comprising an inner member of thin sheet material to overlie a central portion of the wheel, an outer member of thin sheet material in the form of an annulus to lie along the side of the tire-supporting rim, a rod lattice between the members formed by at least one unit comprising a set of rods which are relatively arranged in the manner of a lattice and curved connecting elements between the ends of the rods maintaining their relative arrangement, said members at their outer and inner peripheries respectively having recesses providing seats for the outer sides of the rods at points inwardly of said elements and projecting between the rods to appose said elements, means at the rear of said members for securing the elements to the members to unite the parts, and means for mounting the assembly on a vehicle wheel.

2. A wheel trim as set forth in claim 1 wherein said connecting elements are hoops extending substantially entirely around the circumference of the wheel and support all the lattice forming rods.

3. A wheel trim as set forth in claim 1 wherein the securing means associated with the outer member is in the form of a ring received within the inner periphery of the member and extended radially inwardly to provide a background for the lattice of rods and to conceal the subjacent portions of the wheel.

4. A wheel trim as set forth in claim 1 wherein additional rods are secured to one of the connecting elements and project toward the member to which the outer connecting element is secured and terminate a little short of the same.

5. A wheel trim as set forth in claim 1 wherein the securing means are in the form of rings which are slidably received within the outer and inner peripheries of said members respectively.

6. A wheel trim as set forth in claim 5 wherein the securing means for the connecting elements are two part clips which cooperatively embrace the sides and back of the connecting elements and are joined by a fastener.

7. A wheel trim as set forth in claim 5 wherein the securing means for at least one of the connecting elements comprises a two part clip, one part on the member and one on the ring to receive the connecting element between them, and a fastener for drawing said parts together in embracing relation to the connecting element, one part having a surface diagonal to the element so that when the clip parts are drawn together the securing element and the member are pressed in opposite directions radially of the structure.

8. A wheel trim as set forth in claim 1 wherein the members have rearwardly extending flanges recessed to provide said seats and the securing means are rings which telescope within the flanges and which rings have mating recesses to cooperate in engaging the rods.

9. A wheel trim as set forth in claim 8, wherein the rings and flanges have mating portions; one an axially extending projection and the other an axially extending recess in which it slides.

10. A wheel trim as set forth in claim 9 wherein the projection is struck up from one part and the recess terminates in one of said seats.

11. A wheel trim for mounting over the side of an automobile wheel comprising an inner member of thin sheet material to overlie a central portion of the wheel, an outer member of thin sheet material in the form of an annulus to lie along the side of the tire-supporting rim, a rod lattice between the members formed by at least one unit, such a unit comprising a curved connecting element having a number of rods secured thereto and projecting therefrom and a parallel connecting element to which some but not all of the rods are secured, the two connecting elements providing a means for securing the unit to said members, and for that purpose being disposed rearwardly of the adjacent peripheral portions of said members, said portions having seats to receive the adjacent portions of the rods, means at the rear of said members for securing the elements to the members to unite the parts, and means for mounting the assembly on a vehicle wheel.

12. A wheel trim disposable at the side of an automobile wheel comprising a radially outer member of thin sheet material having an annular portion to overlie the side of the wheel rim and an inwardly directed flange, a radially inner member of thin sheet material having a portion to overlie a central part of the wheel radially spaced from said annular portion and an inwardly directed flange, a lattice to occupy the space between the members comprising a multiplicity of rods integrated into a unitary structure, said flanges having rearwardly opening recesses into which rods of the lattice may be placed by a movement of approach from the rear, a ring telescoping within the flange of the outer member and engaging the lattice to hold the rods in the recesses and having an upturned flange to engage the drop center of the wheel rim, a ring telescoping within the inner member and engaging the lattice to hold the rods in the recesses, means for securing rings and members together and means extending from the second named ring for supporting the trim from the hub portion of the wheel.

13. A wheel trim disposable at the side of an automobile wheel comprising a radially outer member of thin sheet material having an annular portion to overlie the side of the wheel rim and an inwardly directed flange, a radially inner member of thin sheet material having a portion to overlie a central part of the wheel radially spaced from said annular portion and an inwardly directed flange, a lattice to occupy the space between the members comprising a multiplicity of rods integrated into a unitary structure, interior rings for cooperating with each of said members, means for clamping together the respective members and rings with the radially outer and inner portions of the lattice received between them and clamped thereby.

14. A wheel trim for attaching to the side of an automobile wheel comprising a radially outer member of thin sheet material having an annular portion to overlie the side of the wheel rim and an inwardly directed flange, a radially inner member of thin sheet material having a portion to overlie a central part of the wheel radially spaced from said annular portion and an inwardly directed flange, said flanges having rearwardly opening recesses to receive the sides of rods introduced by a movement of approach from the rear, rods received in the recesses and providing a lattice to occupy the space between said members, rings cooperating within the flanges to abut the rods at the recesses, means for securing together the members and their respective rings, and means for mounting the assembly on a vehicle wheel; said rods acting as stops for said members and rings relative to one another.

15. A wheel trim for attaching to the side of an automobile wheel comprising a radially outer member of thin sheet material having an annular portion to overlie the side of the wheel rim and an inwardly directed flange, a radially inner member of thin sheet material having a portion to overlie a central part of the wheel radially spaced from said annular portion and an inwardly directed flange, said flanges having rearwardly opening recesses to receive the sides of rods introduced by a movement of approach from the rear, rods received in the recesses and providing a lattice to occupy the space between said members, rings telescoped within the flanges to maintain the rods in the recesses, means for securing together the members and their respective rings, means cooperating with the ends of the rods to provide opposed radial stresses between the same and the members when the rings are secured, and means for mounting the assembly on a vehicle wheel.

16. A wheel trim for attaching to the side of an automobile wheel comprising a radially outer member of thin sheet material having an annular portion to overlie the side of the wheel rim and an inwardly directed flange, a radially inner member of thin sheet material having a portion to overlie a central part of the wheel radially spaced from said annular portion and an inwardly directed flange, a lattice to occupy the space between the members comprising a multiplicity of rods integrated into a unitary structure, a ring telescoping within the flange of the outer member having an upturned flange to lie adjacent the drop center of the rim, a ring telescoping within the inner member having extending therefrom means for supporting it from the hub portion of the wheel, the lattice of rods occupying the space between said members with end portions of the rods extending between the members and their respective rings and held thereby.

17. A wheel trim for attaching to the side of an automobile wheel comprising a radially outer member of thin sheet material having an annular portion to overlie the side of the wheel rim and an inwardly directed flange, a radially inner member of thin sheet material having a portion to overlie a central part of the wheel radially spaced from said annular portion and an inwardly directed flange, a lattice to occupy the space between the members comprising a multiplicity of rods integrated into a unitary structure, a ring telescoping within the flange of the outer member having an upturned flange to lie adjacent the drop center of the rim, a ring telescoping within the inner member having extending radially and axially inwardly therefrom a flange to lie between the lattice above referred to and the subjacent portions of the wheel, the lattice of rods extending over the space radially intervening between said members with end portions of the rods entering between the members and their respective rings and held thereby.

18. A wheel trim adapted to overlie a conventional automotive wheel comprising a radially outer member having rod receiving notches adapted to lie adjacent the area of a wheel rim, a back ring cooperating with said outer member having rod receiving notches indexed with the notches of said outer member; the indexed notches together forming rod receiving apertures; a radially inner member spaced from said outer member having rod receiving notches adapted to lie adjacent the area of a wheel spider, a back ring cooperating with said inner member having rod receiving notches indexed with the notches of said back ring; the indexed notches together forming rod receiving apertures; a rod-mesh disposed between said outer member and ring and said inner member and ring having rods disposed between said members and rings extending through said members and rings via the apertures occasioned by the indexed notches therein, a hoop joining said rod ends in the area of said outer member on the radial outside of said outer member, a hoop joining said rod ends in the area of said inner member on the radial inside of said inner member, paired radially extending clips on said outer and inner members and rings adapted to be joined together to mechanically unite said hoops with said members and rings so as to not only draw said members and their respective rings together but also to said hoops and the member and ring adjacent thereto in opposite directions to inherently stress the integrated assembly against rattling and squeaking.

19. An automobile wheel trim comprising a radially-outer member, a ring paired with said outer member; said outer member and ring being adapted to lie in the rim area of a wheel; a radially inner member, a ring paired with said inner member; said inner member and ring being adapted to lie in the hub area of a wheel; and rods disposed between and attached to said radially outer member and ring and said radially inner member and ring supporting said outer member and ring on said inner member and ring.

20. In a device as set forth in claim 19, a radially outwardly extending flange emanating from said inner ring lying behind said rods providing a back drop for said rods and providing a shroud screening the otherwise visible portion of the vehicle wheel on which the device is mounted.

21. In a device as set forth in claim 19, mating clips carried by each said member and ring adapted to cooperate with the clips on the mating parts to unite said paired members and rings together and to fix said rods in pressed relationship to said inner member and ring in one direction and in pressed relationship to said outer member and ring in the opposite direction so as to compress the rods between said outer member and said inner member.

22. An automobile wheel trim comprising a radially outer member, a radially outer mating ring telescoped with said outer member; said outer member and ring being adapted to lie in the rim area of a wheel; a radially inner member, a radially inner mating ring telescoping with said inner member; said inner member and ring being adapted to lie in the hub area of a wheel; and rods disposed between and through said telescoped members and rings and constituting a wire mesh interconnecting said members, and constituting a spacer element between said members and their respective rings to limit telescoping.

23. A wheel trim comprising inner and outer radially spaced structures of thin sheet material to overlie respectively areas in front of the central and rim portions of the wheel, said structures being contoured to present forwardly facing areas of substantial extent and flanges extending rearwardly therefrom respectively at the outer and inner sides of such areas, a circularly curved support disposed rearwardly of one of said areas and within the flange appurtenant thereto, simulated spokes secured to said support and crossing the rearward edge of said flange and extending past the rearward edge of the flange of the other structure, means for securing the support to said one structure, and a ring disposed substantially as a continuation of the flange of said other structure rearwardly thereof between which and said flange the simulated spokes extend and which is secured to said other flange to position the simulated spokes.

24. A wheel trim simulating a wire-spoke wheel comprising a radially outer member of thin sheet material to overlie the wheel adjacent the rim, said outer member being rearwardly concave and presenting a forwardly facing area and a rearwardly directed inner periphery, a central member of thin sheet material to overlie the central portion of the wheel, said inner member being rearwardly concave and presenting a forwardly facing area and a rearwardly directed outer periphery, a lattice to overlie the portion of the wheel between said peripheries comprising a number of rods relatively arranged in the manner of spokes and of a length to extend from one member to another past said peripheries and a substantially circular member to which said rods are connected at one end thereof adapted to lie at the rear of one of said members, means for securing together said members and lattice in their relative positions and means connected to one such member at the rear thereof for engagement with a portion of the wheel to suspend the entire trim structure therefrom.

25. A wheel trim comprising inner and outer radially spaced members formed of thin sheet material to overlie respectively areas in front of the center and rim portions of a wheel and having frontwardly facing areas and rearwardly extending flanges at their outer and inner peripheries respectively, a circularly curved support received rearwardly of the frontwardly facing area of one of said members and interiorly of its flange and there secured, simulated spokes carried by said support extending to points at the rear of the frontwardly facing area of the other member and there secured, said flange of the first mentioned member having recesses in which said simulated spokes are received whereby they appear as if based on said flange.

26. A wheel trim comprising inner and outer radially spaced structures of thin sheet material to overlie respectively areas in front of the central and rim portions of the wheel, said structures being contoured to present forwardly facing areas of substantial extent and flanges extending rearwardly therefrom respectively at the outer and inner sides of such areas, a circularly curved support disposed rearwardly of one of said areas and within the flange appurtenant thereto, simulated spokes secured to said support and crossing the rearward edge of said flange and extending past the rearward edge of the flange of the other structure, a similarly circularly curved support disposed rearwardly of said other area and within the flange appurtenant thereto to which support the other ends of said simulated spokes are connected and means for securing the supports to their respective adjacent structures.

27. A wheel trim simulating a wire-spoke wheel comprising a radially outer member of thin sheet material to overlie the wheel adjacent the rim, said outer member being rearwardly concave and presenting a forwardly facing area and a rearwardly directed inner periphery, a central member of thin sheet material to overlie the central portion of the wheel, said inner member being rearwardly concave and presenting a forwardly facing area and a rearwardly directed outer periphery, rods relatively arranged in the manner of spokes extending across said peripheries at the rear thereof, ring elements having respectively inwardly and outwardly facing surfaces which are in effect extensions of the rearwardly directed peripheries of said outer and inner members respectively and cooperating with said members to position the rods and means associated with one of said rings for securing the trim to the wheel.

28. A wheel trim as set forth in claim 27 wherein said rods are permanently secured at at least one of their ends to a circularly curved support disposed rearwardly of the forwardly presented area of one member and forming means for positioning the rods relatively thereto.

29. A wheel trim comprising inner and outer radially spaced structures of thin sheet material to overlie respectively areas in front of the central and rim portions of the wheel, said structures being contoured to present forwardly facing areas of substantial extent with rearwardly directed outer and inner peripheries respectively, a circularly curved support disposed rearwardly of the said area of the outer structure and radially beyond the inner periphery thereof, a first set of simulated spokes secured to said support and extending inward past the rearwardly directed periphery of the inner structure, means for securing said support to the outer structure, means cooperating with the inner structure for securing the inner ends of the simulated spokes, and a second set of simulated spokes secured to said support and extending inwardly therefrom at a different angle to lie rearwardly of the first set and having free ends terminating radially adjacent to, but with a clearance from, the inner structure.

30. A wheel trim comprising inner and outer radially spaced structures of thin sheet material to overlie respectively areas in front of the central and rim portions of the wheel, said structures being contoured to present forwardly facing areas of substantial extent with rearwardly directed outer and inner peripheries respectively, a circularly curved support disposed rearwardly of the said area of the outer structure and radially beyond the inner periphery thereof, a first set of simulated spokes secured to said support and extending inward past the rearwardly directed periphery of the inner structure, means for securing said support to the outer structure, means cooperating with the inner structure for securing the inner ends of the simulated spokes, said inner structure also including a portion having an outwardly presented surface extending rearwardly substantially as an extension of the outer periphery above referred to, and a second set of simulated spokes secured to said support and extending inwardly therefrom at a different angle to lie rearwardly of the first set and having free ends terminating adjacent to, but with a clearance from, said surface.

31. A wheel trim for mounting on the side of an automobile wheel comprising inner and outer radially spaced structures of thin sheet material to overlie respectively areas axially outward of the center and rim portions of the wheel, which members are contoured to provide forwardly presented substantial areas and mutually confronting areas rearwardly of the said forwardly presented areas, simulated spokes extending from the one structure to points rearward of the other structure and there secured, said spokes corresponding in position generally to a conical surface and other shorter spoke-simulating elements similarly extending from said outer structure but at a different angle to the axis to correspond generally to a conical surface of lower altitude and having free ends terminating radially adjacent to, but with a clearance from, the confronting portion of said other structure.

References Cited in the file of this patent

UNITED STATES PATENTS

| Number | Name | Date |
|---|---|---|
| 1,959,255 | Zerk | May 15, 1934 |

FOREIGN PATENTS

| Number | Country | Date |
|---|---|---|
| 626,864 | France | 1927 |
| 714,587 | France | Sept. 7, 1931 |